H. R. GETTLE AND C. S. SCOTT.
EYEGLASS MOUNTING.
APPLICATION FILED OCT. 11, 1921.
1,419,040. Patented June 6, 1922.
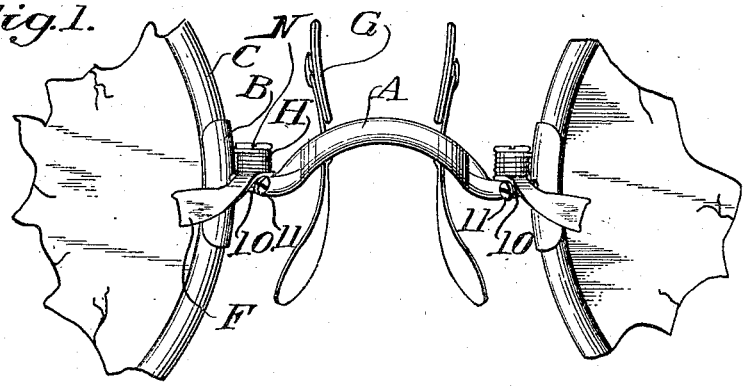
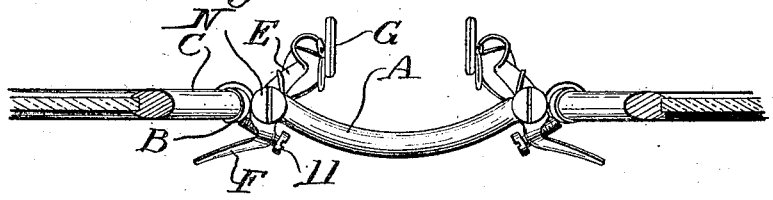
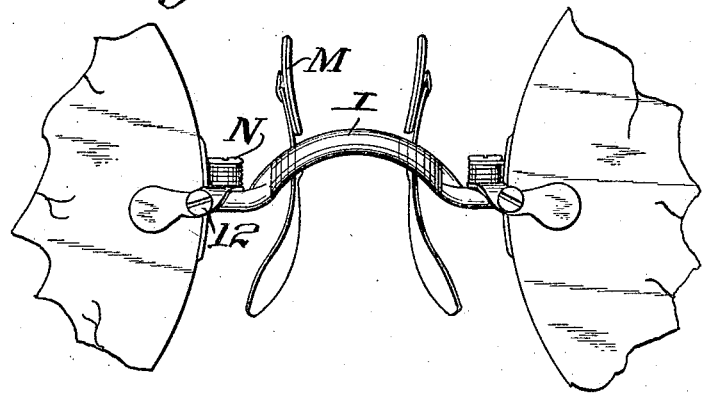
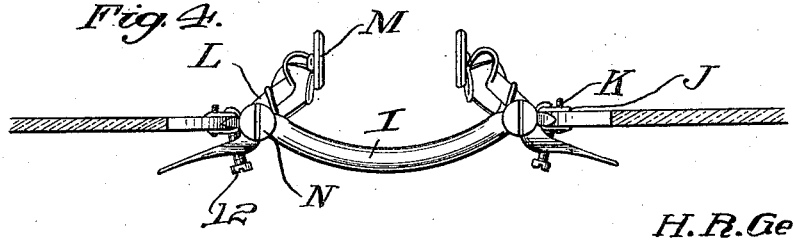
H. R. Gettle.
C. S. Scott.
INVENTOR

UNITED STATES PATENT OFFICE.

HOMER R. GETTLE AND CHARLES S. SCOTT, OF BLUFFTON, INDIANA.

EYEGLASS MOUNTING.

1,419,040.   Specification of Letters Patent.   Patented June 6, 1922.

Application filed October 11, 1921. Serial No. 507,014.

*To all whom it may concern:*

Be it known that we, HOMER R. GETTLE and CHARLES S. SCOTT, citizens of the United States, residing at Bluffton, in the county of Wells and State of Indiana, have invented new and useful Improvements in Eyeglass Mountings, of which the following is a specification.

This invention relates to eye-glasses, particularly to the nose or bridge pieces thereof, and has for its object the provision of a novel eye-glass mounting in which means is provided for varying the tension upon the nose engaging members, whereby to prevent undue or unnecessary severe gripping action of the nose pieces upon the nose of the wearer and thereby to avoid the discomfort commonly experienced in the wearing of glasses of this character.

An important and more specific object is the provision of an eye glass mounting adapted for association with either eye glasses of the rim or rimless types, our device particularly contemplating the provision of a screw adjustment whereby to vary the spring tension upon the nose clamps so that they will not grip with undue severity.

An additional object is the provision of a device of this character which will be simple and inexpensive in manufacture, easy to install and apply, highly efficient and durable in use and a general improvement in the art.

With the above and other objects and advantages in view, the invention consists in the details of construction to be hereinafter more fully described and claimed, and illustrated in the accompanying drawings in which, Figure 1 is a front elevation of eye glasses of the rim type constructed in accordance with my invention, Figure 2 is a horizontal sectional view therethrough taken at substantially the line of connection of the nose or bridge piece with the rims, Figure 3 is a view similar to Figure 1 showing our device as adapted for use in connection with eye glasses of the rimless type and, Figure 4 is a horizontal sectional view therethrough corresponding to Figure 2.

Referring more particularly to the drawings and especially Figures 1 and 2, the letter A designates the usual curved nose piece or bridge which is formed at its ends with the flanges B which are bent about the rims C of the glasses. Pivoted upon the bridge A, by means of screws, are the usual levers E which are provided at one end with lateral extensions F constituting finger grips and which carry at their other ends the elongated nose gripping members G. Coiled about the screws N are the usual springs H which have one arm connected with the lever at one side of the pivot point and which have their other ends connected with the flanges B where the latter are bent about the rim.

In carrying out our invention we provide a lug 10 which is formed upon or secured upon each lever E between the pivot point thereof and the handle extensions F. This lug is provided with a threaded hole through which is screwed a small screw 11 which has its point engaging against the adjacent one of the flanges B. It will be seen that when the screw 11 is screwed into the lug to a less or a greater extent it will engage against the flange and the action will be to cause the lever to swing upon its pivot point so as to vary the distance between the nose grips G.

In the form shown in Figures 3 and 4 the letter I designates the curved bridge or nose piece which is provided at its ends with the usual forks J which receive between them the lenses, the lenses being held in position by the usual screws K which pass therethrough and through the forks J. In this form the levers L which carry the nose grips M are also pivoted as shown at N and are provided with the usual finger grips. The only difference between this form of the device and the other is that in this form I provide screws 12 which instead of being threaded through lugs as in the previously described form are threaded directly through the levers L at such a point as to engage against one side of the forks J.

In both forms of the invention it will be readily seen that when the screws 11 or 12 are adjusted in one direction or the other the distance between the nose grips M or G may be varied so as to vary the tension upon the nose so as to insure comfort to the wearer of the glasses. By this means it is readily seen that the undue drawing or severe gripping action of the nose engaging grip may be regulated so as to insure comfort while at the same time insuring the proper holding action.

While we have shown and described the preferred embodiment of the invention, it is of course to be understood that we reserve the right to make such changes in the form, construction and arrangement of parts as will not depart from the spirit of the invention or the scope of the subjoined claims.

Having thus described our invention we claim;

1. In an eye glass mounting including a nose piece having means thereon for attachment with the lenses of an eye glass, the mounting further including a pair of pivoted levers provided at one end with nose grips and provided at their other ends with lateral extensions constituting finger levers, means carried by the levers and engageable with the end portions of the nose piece whereby to vary the distance between the nose grips, said means comprising screws threaded through the levers and having their ends engaging against the end portions of the nose piece or bridge.

2. In an eye glass mounting including a bridge or nose piece adapted to carry lenses or adapted to carry rims holding the lenses, the eye glass mounting further including spring pressed pivoted levers provided at one end with nose grips and provided at their other ends with handles, lugs on said levers between the pivot points thereof and the handles, and screws threaded through said lugs and engaging against the end portions of the bridge or nose piece whereby to vary the tension on said springs and to regulate the distance between the nose grip.

In testimony whereof we affix our signatures.

HOMER R. GETTLE.
CHARLES S. SCOTT.